United States Patent [19]

Trihey

[11] 4,313,421

[45] Feb. 2, 1982

[54] SOLAR HEATING APPARATUS FOR SWIMMING POOLS

[75] Inventor: John M. Trihey, Bayswater, Australia

[73] Assignee: Vulcan Australia Limited, Burwood, Australia

[21] Appl. No.: 171,108

[22] Filed: Jul. 22, 1980

Related U.S. Application Data

[63] Continuation of Ser. No. 940,347, Sep. 6, 1978, abandoned.

[51] Int. Cl.³ .......................... F24J 3/02; E04H 3/19
[52] U.S. Cl. ...................................... 126/415; 4/499; 4/502; 126/426
[58] Field of Search ...................... 126/415, 416, 426; 4/498, 499, 500, 501, 502

[56] References Cited

U.S. PATENT DOCUMENTS

| | | | |
|---|---|---|---|
| 3,019,450 | 2/1962 | Karasiewicz | 4/502 |
| 3,051,232 | 8/1962 | Lamb | 4/500 |
| 3,074,079 | 1/1963 | Isaacson | 4/500 |
| 3,541,615 | 11/1970 | Myrtha | 4/503 |
| 3,613,125 | 10/1971 | Ivkovich | 4/500 |
| 3,683,428 | 8/1972 | Morris | 4/498 |
| 3,859,980 | 1/1975 | Crawford | 126/426 |
| 3,949,095 | 4/1976 | Pelehach | 126/415 |
| 4,028,750 | 6/1977 | Gustafsson | 4/498 |
| 4,079,726 | 3/1978 | Voelker | 126/415 |
| 4,137,575 | 2/1979 | Klaffke | 4/498 |

Primary Examiner—Daniel J. O'Connor
Attorney, Agent, or Firm—Holman & Stern

[57] ABSTRACT

A cover for a swimming pool is disclosed comprising first and second layers of plastics material joined together at join zones, to define a plurality of spaces therebetween the spaces being inflated or inflatable, whereby the cover floats when placed on the surface of a pool with the second layer lowermost, at least the second layer being distended away from the join zones and having downwardly projecting crests which in use contact the surface of the pool and the join zones are located above the surface of the pool and wherein drainage holes are formed through the first and second layers at the join zones to provide fluid communication paths from the upper side of the cover to the air space defined between adjacent crests in the second layer and the surface of the pool whereby rainwater drains effectively into the air spaces so defined and then into the pool.

6 Claims, 13 Drawing Figures

SOLAR HEATING APPARATUS FOR SWIMMING POOLS

This is a continuation of application Ser. No. 940,347, filed Sept. 6, 1978, now abandoned.

BRIEF SUMMARY OF THE INVENTION

This invention relates to covers for swimming pools.

It is known to form swimming pool covers from sheet plastics material which has on its surface a multiplicity of sealed pockets of air. It is further known to employ such covers as solar heaters for the pool water, see for instance U.S. Pat. No. 4,079,726. A disadvantage of such arrangements is that rain water accumulates on the top of the covers causing localized parts thereof to sink beneath the surface. An object of the invention is to avoid this problem.

According to the present invention there is provided a cover for a swimming pool said cover comprising first and second layers of plastics material joined together at join zones, to define a plurality of spaces therebetween, said spaces being inflated or inflatable whereby said cover floats when placed on the surface of a pool with said second layer lowermost, at least said second layer being distended away from said join zones and having downwardly projecting crests which in use contact the surface of the pool and said join zones are located above the surface of the pool and wherein drainage holes are formed through the first and second layers at said join zones to provide fluid communication paths from the upper side of the cover to the air space defined between adjacent crests in said second layer and the surface of the pool.

BRIEF DESCRIPTION OF THE SEVERAL VIEWS OF THE DRAWINGS

The invention will now be further described with reference to the accompanying drawings, in which.

DETAILED DESCRIPTION

Figure 1:
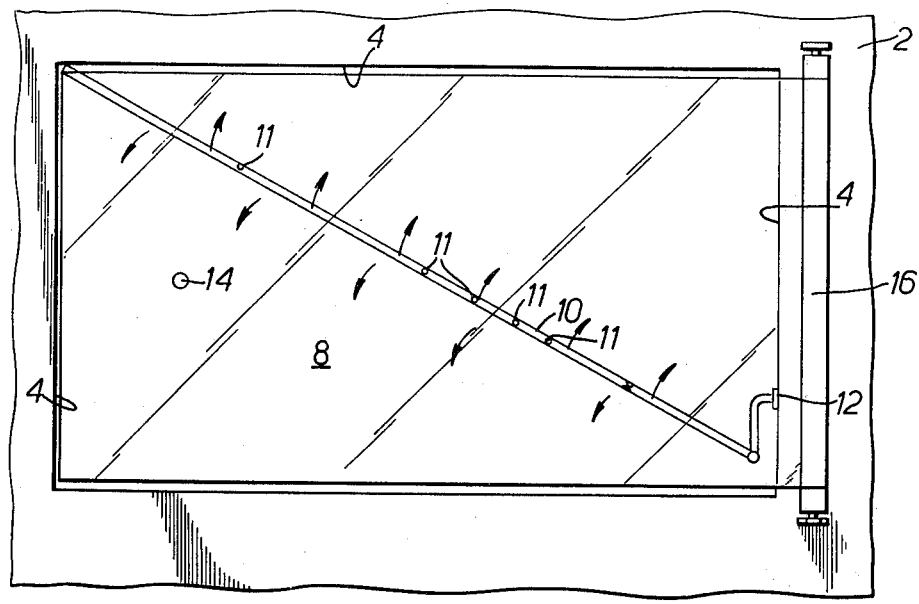
FIG. 1 is a plan view of a swimming pool having a cover applied thereto in accordance with the present invention.

In FIG. 1 there is shown a pool having a concourse 2, side walls 4 and a bottom 6. The pool has fitted thereto a combination solar heating device and pool cover in accordance with the invention. The device comprises a sheet 8 of flexible material arranged to be located on the surface of the water in the pool. The sheet 8 may be supported by floats (not shown) or by connecting means (not shown) for connecting the periphery of the sheet to the sides of the pool. It is however preferred that the sheet comprises material which has a specific gravity less than 1.0, suitable material in this respect being low density polypropylene. The preferred colour of the sheet is black so as to maximise solar energy absorbtion. The sheet 8 is in contact with the surface of the water and therefore transfers heat to the water when the sheet 8 becomes heated by the sun.

The efficiency of the device can be greatly increased by circulating the water in the pool so as to avoid build up of hot layers of water near the sheet 8. Accordingly, the device includes a hose 10 having holes 11 along its length for circulation of water beneath the layer 8. The hose 10 can be connected to the underside of the layer 8. In use of the device, the end of hose 10 is connected to the outlet 12 from which water is normally returned to the pool after filtering. It is preferred that the water is drawn from near the bottom of the pool, say from the bottom drain hole 14 so that relatively cold water is circulated through the hose 10.

Figure 2:
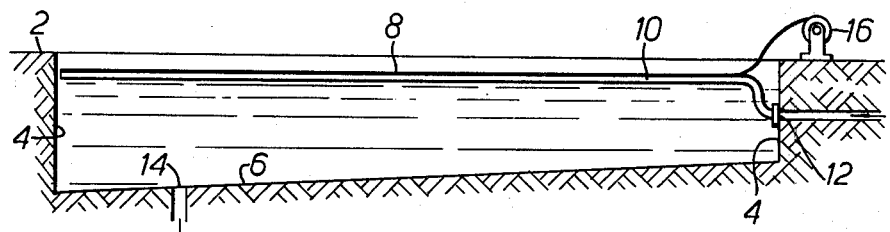
FIG. 2 is a cross-sectional view through the pool shown in FIG. 1.

In the arrangement shown in FIG. 2, the cover 8 is mounted on a spring loaded roller 16 which extends across one end of the pool so that the sheet can be quickly retracted when it is desired to use the pool.

Figure 3:
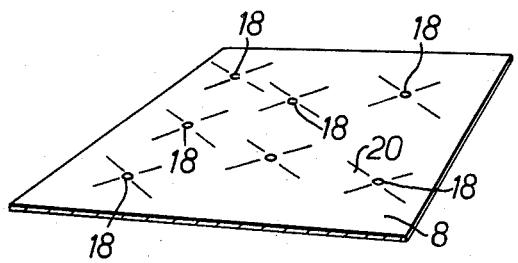
FIG. 3 is a perspective view of part of the sheet which is included in the cover shown in FIGS. 1 and 2.

It is preferred that the sheet 8 includes perforations to allow rain water to enter the pool rather than being collected above the sheet. FIG. 3 shows a preferred form of arrangement in this respect wherein the perforations 18 are formed in depressions which are formed by heat impressed crease lines 20.

Figure 4:
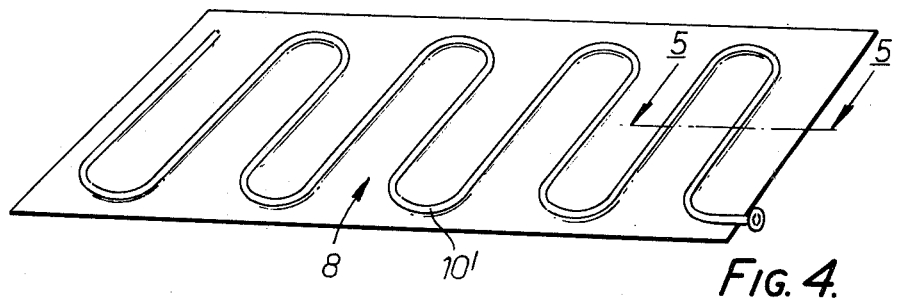
FIG. 4 is a perspective view of a modified form of cover.
Figure 5:
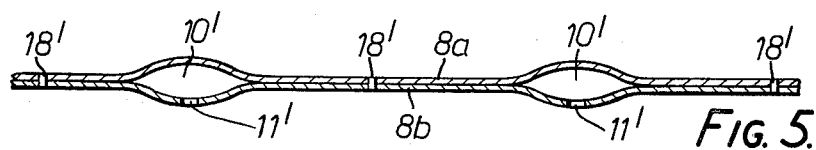
FIG. 5 is a cross-sectional view through part of the cover shown in FIG. 4 taken along the line 5—5.

FIGS. 4 and 5 illustrate a modified form of sheet which comprises two layers 8a and 8b which are joined together over their entire surfaces apart from a meandering strip which defines a conduit 10' for circulating water.

Figure 6:
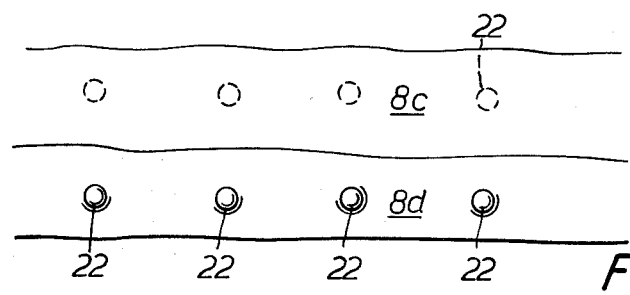
FIG. 6 is a partly broken way view of a portion of a modified form of cover sheet.
Figure 7:
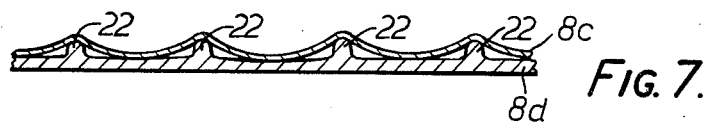
FIG. 7 is a cross-sectional view of the sheet shown in FIG. 6.
Figure 8:
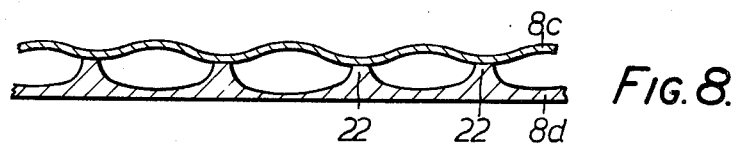
FIG. 8 is a similar view to FIG. 7 but showing the sheet in an inflated condition.

The arrangement illustrated in FIGS. 6, 7 and 8 illustrates a further modified form of sheet 8. The sheet comprises upper and lower sheets 8c and 8d and spacing means 22 located between the sheets. In the illustrated arrangement, the spacing members 22 are integral with the lower sheet 8d but this is not essential. The upper sheet 8c is connected to only the peaks of the spacing members 22. In use of this form of sheet, air can be pumped into the space defined between the sheets 8c and 8d so as to separate the two sheets as seen in FIG. 8. In this condition, a layer of air separates the two sheets apart from the contact made by the spacing members 22. The sheet thus becomes a relatively good heat insulating layer for insulating the pool during the times when the sun is not shining to prevent heat losses from the pool. Sensing means may be provided to automatically operate an air fan to "inflate" the sheet when the sun is not shining. When the sun is shining, the air is withdrawn from between the sheets 8c and 8d so that a substantial portion of the sheet 8c bears against the sheet 8d to provide a relatively good thermal conduction path from the sheet 8c to the sheet 8d, as seen in FIG. 7. This modified form of sheet would still require circulating means such as of the type shown in FIG. 1 or FIG. 4.

Figure 9:
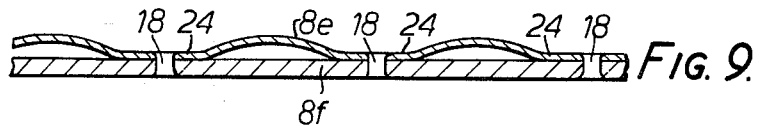
FIG. 9 shows a modified form of cover sheet.

FIG. 9 illustrates another two layer sheet which is "inflatable" in the same manner as the sheet illustrated in FIGS. 6 to 8. In this arrangement, an upper sheet 8e is bonded directly to a lower sheet 8f at contact regions 24. The sheets 8e and 8f, between the contact regions 24, are separable for collapsing into contact with one another according to whether air is pumped into or withdrawn from between the sheets. The contact regions 24 include the perforations 18 to permit drainage of rain water.

Many modifications will be apparent to those skilled in the art without departing from the spirit and scope of the invention.

Figure 10:
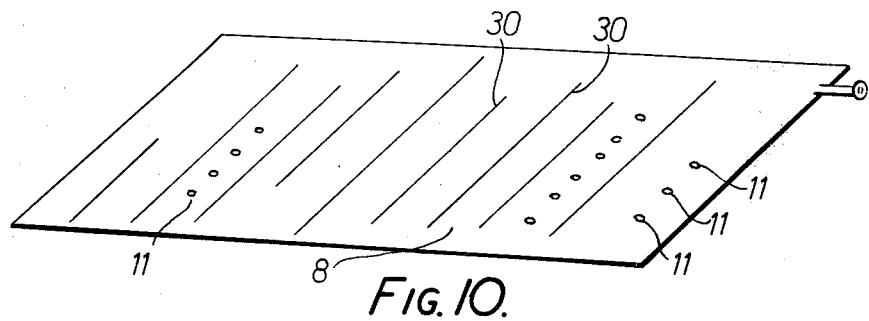
FIGS. 10 and 11 show a modified form of the cover shown in FIG. 4.
Figure 11:
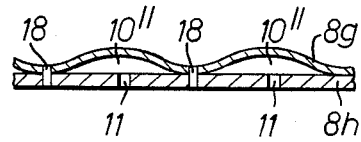

For instance, FIGS. 10 and 11 show a modified form of the heating apparatus shown in FIG. 4. In this arrangement seam lines 30 define the meandering conduit 10" for circulating water. As best seen in FIG. 11, the conduit 10" extends over a major portion of the surface of the cover.

Figure 12:
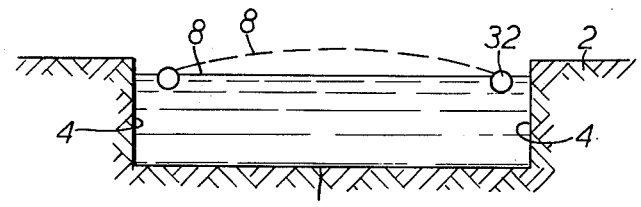
FIG. 12 illustrates a further modified form of the invention.

FIG. 12 illustrates a further modified form of the invention. In this arrangement the periphery of the sheet 8 is connected to a float structure 32 which has the same shape as the pool. When the sun is shining the sheet 8 is arranged to be in contact with the surface of the pool by withdrawing air from beneath the sheet 8. When the sun is not shining air is pumped beneath the sheet to raise it to the position shown in broken lines to thereby insulate the surface of the pool. Water circulating means, such as of the type disclosed previously would be required for efficient operation.

The arrangement of FIG. 12 could be further modified by inclusion of a lower sheet connected to the float structure 32 so that the space between the two sheets can be inflated. This avoids any heat transfer taking place via condensation drops which would otherwise form on underside of the sheet 8 and be returned to the pool.

Figure 13:
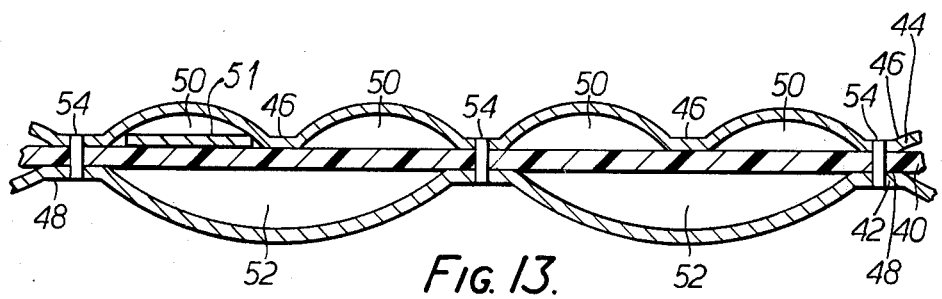
FIG. 13 illustrates a still further form of the invention.

The preferred form of the invention is illustrated in FIG. 13. In this embodiment a black sheet 40 has sheets 42 and 44 bonded to lower and upper sides thereof at contact lines 46 and 48. It is preferred that the sheet 44 is transparent so as to enable solar energy to infringe upon the black sheet 40. The spaces between the sheets 40 and 44 form water circulation passages 50, through which pool water is circulated and heated by contacting the sheet 40. The pool water can be returned to the pool via the normal inlet for filtered water. The spaces 52 between the sheets 40 and 42 are inflatable with air either permanently or selectively via an air pump. The inflated spaces ensures that the device floats on the surface of the pool, imparts a degree of rigidity to the device, and insulates the surface of the pool from heat losses. Drainage holes 54 are formed through the sheets at the places where the contact lines 40 and 48 coincide. It is preferred that the contact lines 46 and 48 extend perpendicularly to one another whereby all of the troughs formed by the contact lines 46 of the upper sheet 44 can be drained.

With the arrangement shown in FIG. 13, it is possible to roll up the device with the spaces 52 deflated, and cause unrolling of the device onto the pool by inflating the spaces. Rolling up of the device could be automatically effected by setting coil, or spiral, springs 51 within the device so that upon deflation of the spaces 52, the spring causes the rolling up to take place, the spaces 50 being emptied of water.

The arrangement has the advantage that the combined density of the sheets 40, 42 and 44 can be made greater than water or weighted, so that upon deflation of the spaces 52, the device sinks to the bottom of the pool so that the pool can be used. Sinking of the device is facilitated by water passing through the drainage holes 54. A flexible air hose could be connected to the device in communication with the spaces 52 to effect inflation so that the device can again float on the surface.

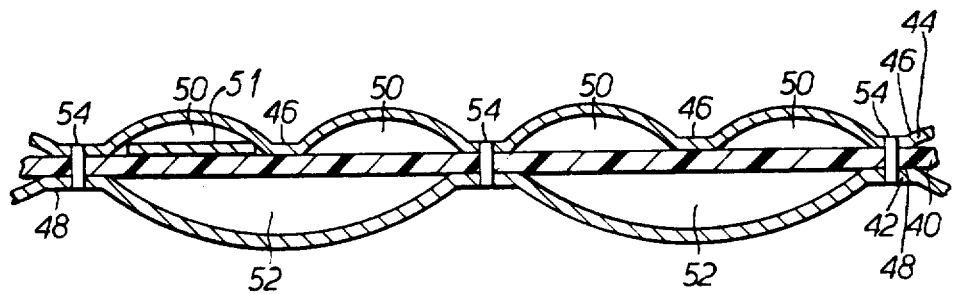

I claim:

1. A cover for a swimming pool, said cover comprising first and second layers of plastics material joined together at join zones, to define a plurality of spaces therebetween, said spaces being inflatable whereby when inflated said cover floats when placed on the surface of a pool with said second layer lowermost, at least said second layer being distended away from said join zones and having downwardly projecting crests when inflated which contact the surface of the pool and support said join zones above the surface of the pool to define airspaces between the surface of the pool and adjacent crests, and wherein drainage holes are provided extending through the first and second layers at said join zones communicating between the top surface of the cover and the airspaces defined between adjacent crests in said second layer and the surface of the pool, and spiral springs are provided operably connected to said layers and having a predetermined spring force to unroll the cover upon inflation of said spaces and to roll up the cover upon deflation of said spaces.

2. A cover as claimed in claim 1 wherein an air pump is provided operably connected to said spaces to inflate said spaces.

3. A swimming pool cover as claimed in claim 1, and further including a circulating conduit through which pool water can be passed whereby the water so circulated is heated by incident solar radiation.

4. A cover for a swimming pool comprising at least an upper, lower and an intermediate layer of plastics material joined together at join zones, at least some of said join zones of the upper and lower layers being aligned and said upper layer having additional join zones located approximately midway between said aligned join zones to define a plurality of upper and lower spaces therebetween, said lower spaces being inflatable whereby when inflated said cover floats when placed on the surface of a pool with said lower layer being distended away between said aligned join zones and having downwardly projecting crests which when said lower spaces are inflated contact the surface of the pool and support said join zones above the surface of the pool to define airspaces between the surface of the pool and adjacent crests, drainage holes extending through said aligned join zones communicating between the top surface of the cover and said airspaces defined between said adjacent crests and the surface of the pool, spiral springs connected to the layers having a predetermined spring force to roll up the cover on deflation of said lower spaces, an air pump operably connected to said lower spaces to inflate said spaces, and a circulating conduit through which pool water can be passed whereby the water so circulated is heated by incident solar radiation.

5. A swimming pool cover as claimed in claim 4 wherein said circulating conduit is comprised of said upper spaces.

6. A swimming pool cover as claimed in claim 5 wherein said upper layer is transparent and said intermediate layer is black.

* * * * *

UNITED STATES PATENT AND TRADEMARK OFFICE
CERTIFICATE OF CORRECTION

PATENT NO. : 4,313,421

DATED : February 2, 1982

INVENTOR(S) : John Massey Trihey

It is certified that error appears in the above—identified patent and that said Letters Patent is hereby corrected as shown below:

The title page should appear as shown on the attached sheet.

Signed and Sealed this

Twelfth Day of October 1982

[SEAL]

Attest:

Attesting Officer

GERALD J. MOSSINGHOFF

Commissioner of Patents and Trademarks

United States Patent [19]

Trihey

[11] 4,313,421
[45] Feb. 2, 1982

[54] SOLAR HEATING APPARATUS FOR SWIMMING POOLS

[75] Inventor: John M. Trihey, Bayswater, Australia

[73] Assignee: Vulcan Australia Limited, Burwood, Australia

[21] Appl. No.: 171,108

[22] Filed: Jul. 22, 1980

Related U.S. Application Data

[63] Continuation of Ser. No. 940,347, Sep. 6, 1978, abandoned.

[51] Int. Cl.³ ............................. F24J 3/02; E04H 3/19
[52] U.S. Cl. .................................. 126/415; 4/499; 4/502; 126/426
[58] Field of Search ............... 126/415, 416, 426; 4/498, 499, 500, 501, 502

[56] References Cited

U.S. PATENT DOCUMENTS

| | | | |
|---|---|---|---|
| 3,019,450 | 2/1962 | Karasiewicz | 4/502 |
| 3,051,232 | 8/1962 | Lamb | 4/500 |
| 3,074,079 | 1/1963 | Isaacson | 4/500 |
| 3,541,615 | 11/1970 | Myrtha | 4/503 |
| 3,613,125 | 10/1971 | Ivkovich | 4/500 |
| 3,683,428 | 8/1972 | Morris | 4/498 |
| 3,859,980 | 1/1975 | Crawford | 126/426 |
| 3,949,095 | 4/1976 | Pelehach | 126/415 |
| 4,028,750 | 6/1977 | Gustafsson | 4/498 |
| 4,079,726 | 3/1978 | Voelker | 126/415 |
| 4,137,575 | 2/1979 | Klaffke | 4/498 |

Primary Examiner—Daniel J. O'Connor
Attorney, Agent, or Firm—Holman & Stern

[57] ABSTRACT

A cover for a swimming pool is disclosed comprising first and second layers of plastics material joined together at join zones, to define a plurality of spaces therebetween the spaces being inflated or inflatable, whereby the cover floats when placed on the surface of a pool with the second layer lowermost, at least the second layer being distended away from the join zones and having downwardly projecting crests which in use contact the surface of the pool and the join zones are located above the surface of the pool and wherein drainage holes are formed through the first and second layers at the join zones to provide fluid communication paths from the upper side of the cover to the air space defined between adjacent crests in the second layer and the surface of the pool whereby rainwater drains effectively into the air spaces so defined and then into the pool.

6 Claims, 13 Drawing Figures